United States Patent [19]

Hall

[11] 3,887,220
[45] June 3, 1975

[54] HITCH FOR TRAILERS OVERHANGING A CAR BODY

[76] Inventor: Percy P. Hall, 4103 W. Main St. Apt. 21, Kalamazoo, Mich. 49007

[22] Filed: Oct. 5, 1973

[21] Appl. No.: 403,774

Related U.S. Application Data

[62] Division of Ser. No. 306,042, Nov. 13, 1972.

[52] U.S. Cl. .......................... 280/423 R; 280/423 R
[51] Int. Cl. ............................................. B62d 53/00
[58] Field of Search ........................ 280/423 R, 437

[56] References Cited
UNITED STATES PATENTS

| | | | |
|---|---|---|---|
| 1,948,677 | 2/1934 | Robin | 280/437 |
| 3,383,119 | 5/1968 | Carroll | 280/423 R |
| 3,392,992 | 7/1968 | Baker et al. | 280/423 R |
| 3,756,624 | 9/1973 | Taylor | 280/423 R |
| 3,770,297 | 11/1973 | Quick | 280/423 R |

*Primary Examiner*—David Schonberg
*Assistant Examiner*—R. Schrecengost
*Attorney, Agent, or Firm*—Austin A. Webb

[57] ABSTRACT

A raised front end of a trailer is connected over the top of a sedan by means of a cross bar swivelly connected to the bottom of the trailer and having pins at its ends received in saddles attached to a support frame removably secured across the top of the sedan. The cross frame is connected to the top corner frame portions of the sedan by means of longitudinally spaced brackets that project between the body frame and one or two doors of the sedan, and straddle a body center post if necessary to locate the pivotal support of the trailer over the longitudinal center of the spring center of the sedan.

5 Claims, 4 Drawing Figures

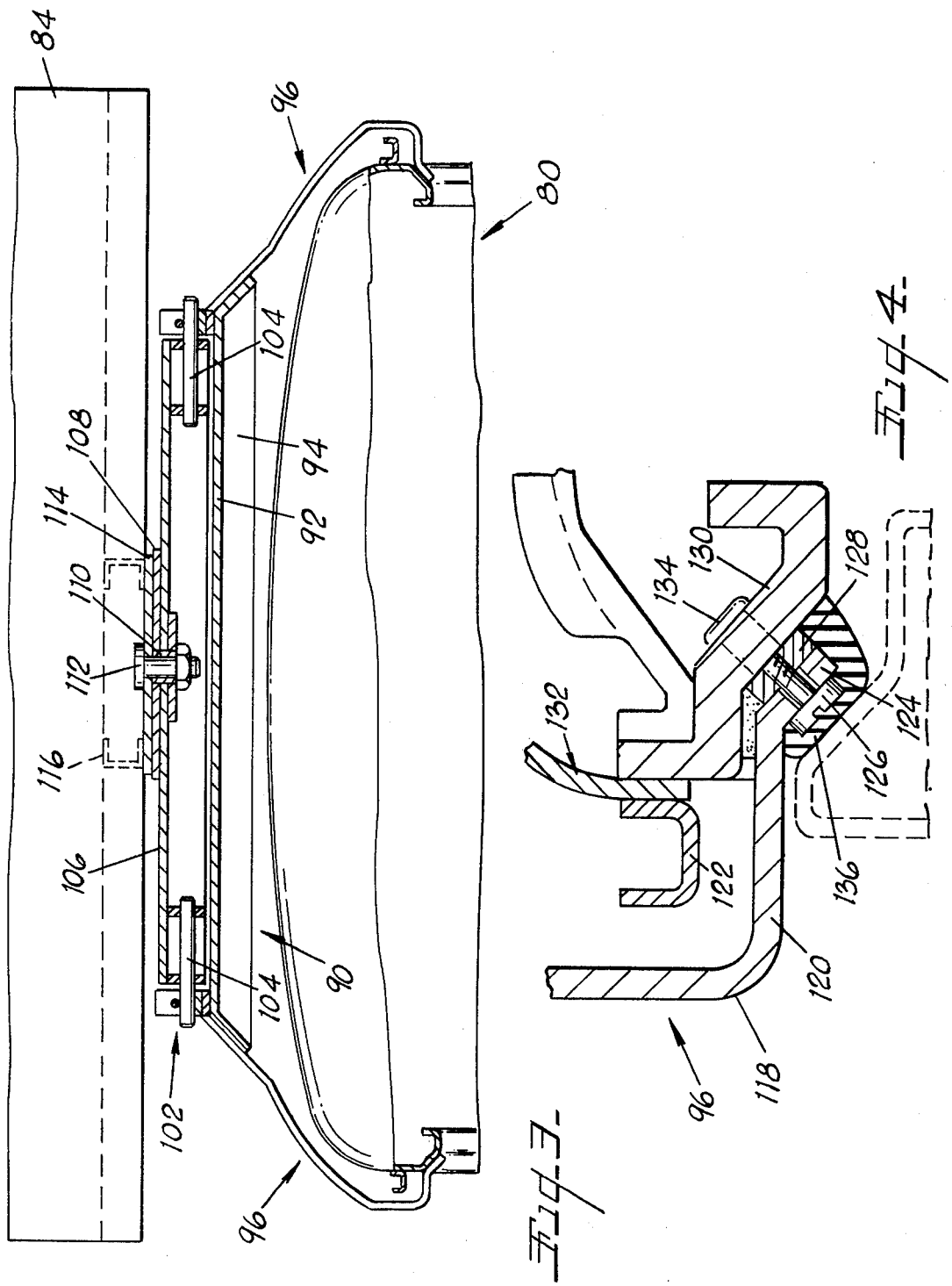

HITCH FOR TRAILERS OVERHANGING A CAR BODY

RELATED APPLICATION

This application has been divided from applicant's copending application Ser. No. 306,042, filed Nov. 13, 1972 for Hitch For Trailers Overhanging A Truck Bed Or Car Body, and the benefit of the filing date of that application is claimed for this application.

OUTLINE OF INVENTION

Prior trailer hitches have provided short coupling pins on the front ends of the trailer which are releasably engageable in small versions of the "fifth wheel" coupling used on heavy duty highway freight trailers and truck tractors. These not only had releasable locks to the fifth wheel, but further required removal of the heavy "fifth wheel" before the car could be used to full capacity, or in a normal manner.

The present invention provides a bearing on a vertical axis which is permanently connected to the trailer. The bearing and the cross bar to which it is connected is released and removed with the car, thus leaving the vehicle free for normal use without the trailer. Cammed guides for easier alignment and engagement of the cross bar with the mounting connections on the vehicle are provided. The car top carries a plate on which pivotal supports for the ends of the cross bar are mounted.

DESCRIPTION

The drawings, of which there are two sheets, show a practical and preferred form of the hitch as applied to a sedan.

FIG. 3 is an enlarged vertical cross sectional view taken along the plane of the line 3—3 in FIG. 2.

FIG. 4 is a fragmentary enlarged cross sectional view taken along the plane of the line 4—4 in FIG. 2.

Figure 1:
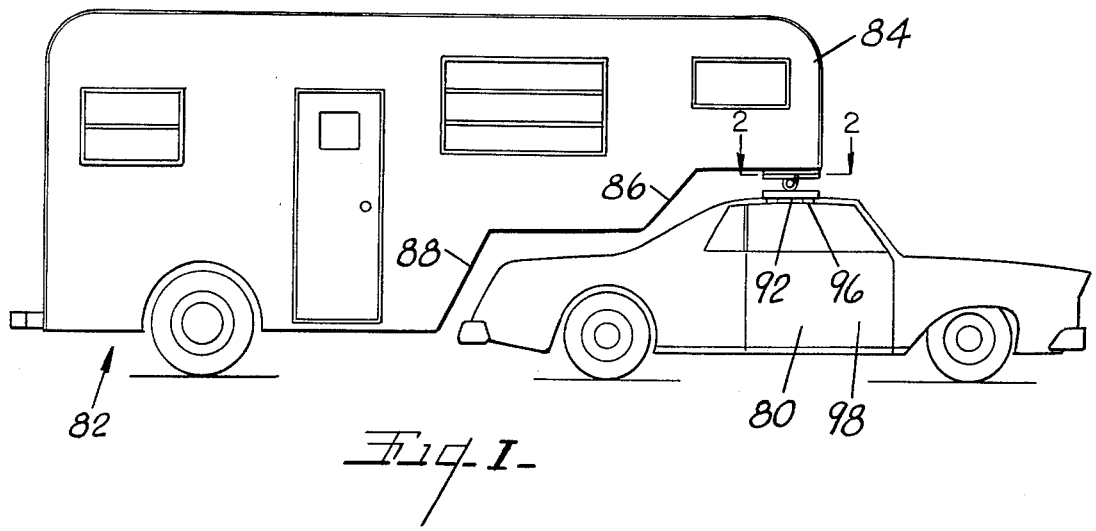
FIG. 1 is a side elevational view of a trailer and hitch connected to a sedan.
Figure 2:
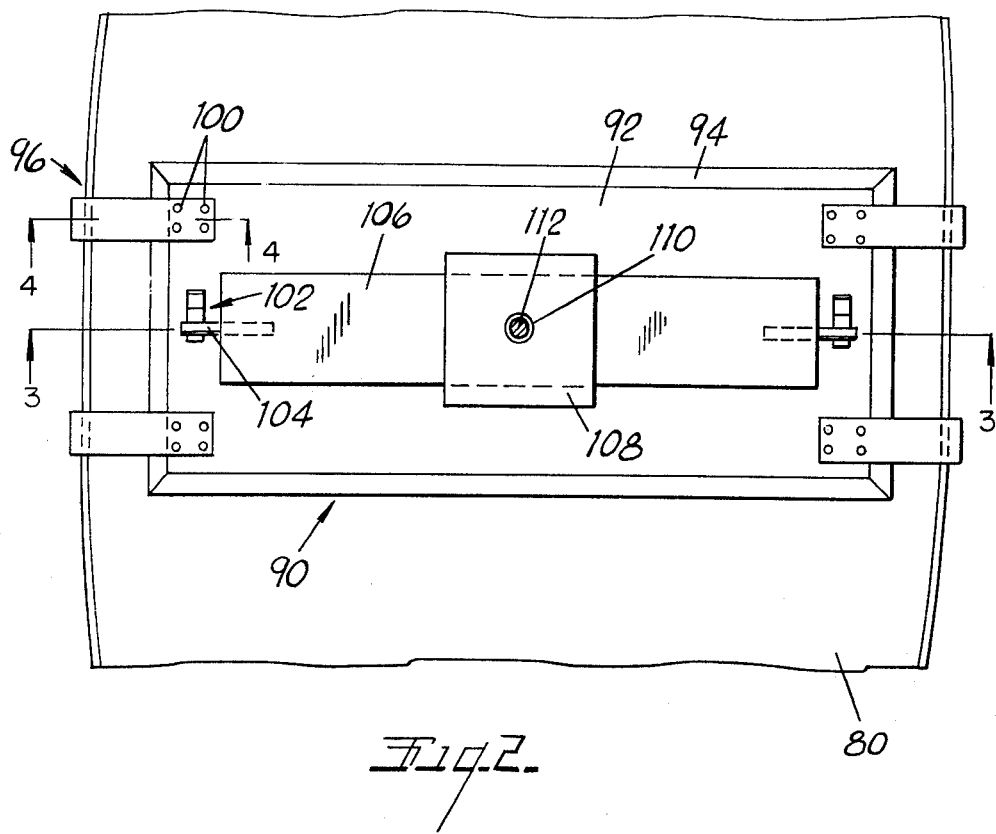
FIG. 2 is a horizontal cross sectional view taken along the plane of the line 2—2 in FIG. 1.

The hitch shown in FIGS. 1 to 4 shows a sedan type vehicle 80 and a modified trailer 82 which has a higher elevated front end 84 which steps downwardly over the back of the top of the vehicle as at 86 and then further downwardly behind the trunk at 88. This could obviously be arranged in one step if desired, or the forward end 84 could be an unenclosed strut or towing frame. The hitch between the two vehicles is desirably located over the longitudinal center of the spring support of the sedan, and this is accomplished on various makes and styles of sedans by the construction of the roof top support generally indicated at 90 as will be described.

The top support consists of a top member of sufficient rigidity and strength to carry the entire towing load of the trailer. The example shown is a rectangular plate 92 with angled reinforcing edge flanges 94. The plate is connected to the side corner edges of the body as will be described in greater detail presently, by four corner brackets generally indicated at 96. The brackets connect to the car along the frame of the door 98, and by using two spaced brackets on each side, these can be inserted in the single door opening of the two door sedan shown, or may bridge the center post found between the doors of a four door sedan. The four brackets are desirably adjustably bolted as at 100 to the corners of the plate 92. That is, the bolt connections 100 may be used to connect the same plate 92 to different sizes and makes of cars by simply providing brackets which are sized to the particular sedan involved.

Near its opposite ends the plate 92 carries permanently attached saddle elements 102 in the form of J-hooks. These serve to removably and rockably receive the ends of pins 104 projecting from the ends of the transverse support bar 106. The bar and pins may be the same as parts 40 and 42 previously described in the copending application Ser. No. 306,042, filed Nov. 13, 1972. The channel bar 106 carries a lower bearing plate 108 rigidly connected to its upper surface and the plate and channel support an upright bushing 110 which permanently and rotatably receives the towing pin 112. The pin is carried by and projects below a mounting plate 114 similar to plate 54. The plate is permanently secured to suitable mounting or frame elements 116 of the trailer on the towing frame of the trailer.

As far as longitudinal points of connection of the yoke elements to the vehicles is concerned, the mounting plate 92 and yokes 102 are desirably adjusted longitudinally of the sedan 80 so that the tongue weight of the trailer is equally supported by all four wheels of the sedan.

FIG. 4 is a conventionalized representation of a connection of the corner brackets 96 to the top of the car. Relatively heavy straps 118 which form the brackets extend inwardly at 120 under the drip trough 122 and angle downwardly at 124 where they are secured by screws 126 to a mounting plate 128. The plate is attached to the side frame or edge support channel 130 of the roof panel 132 as by blind rivets 134, and is desirably located under the usual door seal gasket 136, so that the brackets and hitch supporting plate 92 can be removed without leaving any visible marks on the car.

When the trailer is disconnected from the car, only the brackets 96 and the plate 92 which may be attractively finished remain, and can be used as a car top luggage carrier.

What is claimed as new is:

1. A hitch between trailers and towing vehicles in which the trailer has a forward end elevated above and adapted to be connected to an upper part of the vehicle, said hitch comprising:
   A. a pair of upwardly opening yoke members,
   B. means connecting said yoke members in transversely aligned relation adjacent opposite sides and over the top of the body of said vehicle,
   C. an upper bearing plate having a transverse width of the order of one foot attachable in fixed lapped relation to an exposed under surface of the front end of said trailer,
   D. a lower bearing plate approximately coextensive with said upper bearing plate and permanently connected in coasting relation thereto by a central vertical pivot,
   E. a transverse support bar rigidly connected to said lower bearing plate and projecting beyond the sides thereof,
   F. and rocker pins carried by the ends of said support bar and projecting therefrom in position to be removably received in said yoke members.

2. A hitch as defined in claim 1 in which said means connecting said yoke members comprises:

G. a rigid plate having said yoke members connected to its opposite edges,

H. and corner brackets connected in spaced relation to the corners of said rigid plate and projecting laterally and downwardly therefrom,
1. the lower outer ends of said brackets having reverse curves adapted to project around the upper side edges of a vehicle roof,
2. and lower terminal ends on said brackets adapted to be secured to upper side frame elements of a vehicle body and project therefrom above the doors of the vehicle to support the rigid plate in spaced relation to the top of the vehicle.

3. A hitch connection between trailers and towing vehicles in which the trailer has a raised forward end adapted to overlie an upper portion of said vehicle, said hitch comprising:

A. lapped load supporting plates permanently pivotally connected near their centers, B. means fixedly connecting the upper of said plates to the underside of the raised forward end of said trailer, C. a support bar fixedly connected to the lower of said plates and projecting laterally beyond each side thereof, D. first bearing means permanently connected to the ends of said support bar and extending in aligned longitudinal relation thereto, E. and second bearing means connected in upwardly exposed relation over an upper surface of said vehicle in laterally spaced and in transversely aligned relation relative to the vehicle, F. said first and second bearing means being vertically disengageably from an engaged vertically supporting and longitudinally retaining relation.

4. A hitch connection as defined in claim 3 in which said first bearing means are externally convex and said second bearing means are coactingly concave.

5. A hitch connection as defined in claim 3 in which said second bearing means are located over a central passenger area of the vehicle by being mounted on a rigid support extending over the top of the vehicle and connected at its ends to longitudinal side edges of said top.

* * * * *